Patented Aug. 14, 1945

2,382,792

UNITED STATES PATENT OFFICE 2,382,792

PLASTICIZING NEOPRENE

Louis H. Howland, Cheshire, Conn., assignor to United States Rubber Company, New York, N. Y., a corporation of New Jersey No Drawing. Application February 6, 1942, Serial No. 429,807

13 Claims. (Cl. 260—36)

The present invention relates to processing of rubber-like masses of polychloroprenes known to the trade as neoprene, and more particularly to methods of preparing plastic conversion products of that type of neoprene known as neoprene GN and similar polychloroprenes, and to the new resulting compositions.

Although ordinary rubber and neoprene have certain properties in common, it is known that they are diverse in their action to many chemicals. For example, benzothiazyl disulfide (Altax) is sold as a vulcanization accelerator for use in natural rubber compounds, whereas it is sold as a retarder of vulcanization for use in neoprene compounds. Also, whereas heat tends to soften rubber, it has a hardening action on neoprene probably due to continued polymerization. Hence, the behavior of the present chemicals are empirical to neoprene.

The new plasticizers for the elastic polychloroprenes, denoted neoprene, whereby to provide new plastic conversion products thereof having decreased viscosity—are the reaction products of aldehydes and primary or secondary aliphatic, aralkyl, alicyclic or heterocyclic amines. The materials resulting from reacting 1 molecular proportion of aldehyde with 2 molecular proportions of a secondary amine, or 1 molecular proportion of aldehyde with 2 molecular proportions of a primary amine are believed to have the following structure:

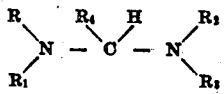

wherein R and $R_2$ are hydrogen or aliphatic hydrocarbon groups; $R_1$ and $R_3$ are aliphatic hydrocarbon groups; and $R_4$ is hydrogen or an aliphatic, aromatic, aralkyl, or heterocyclic group; R and $R_1$ and/or $R_2$ and $R_3$ may be joined together by a group as pentamethylene, hexamethylene, etc. When 1 molecular proportion of aldehyde is reacted with 1 molecular proportion of primary amine, the structure is believed to be:

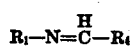

wherein $R_1$ and $R_4$ are as indicated above, or a polymer thereof having the probable formula:

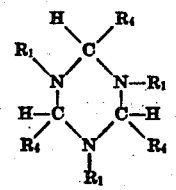

wherein $R_1$ and $R_4$ are as indicated above. $R_1$ and $R_4$ may be different when a mixture of primary amines and a mixture of aldehydes are reacted together.

Exemplary of such chemicals are:

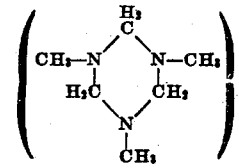

Trimethyl trimethylene-triamine

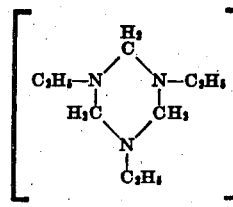

Triethyl trimethylene-triamine

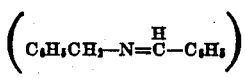

Benzal-benzylamine

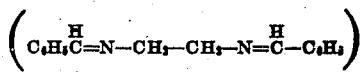

Dibenzal-ethylene-diamine

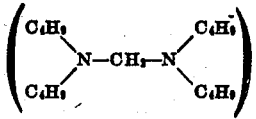

Tetrabutyl-methylene-diamine

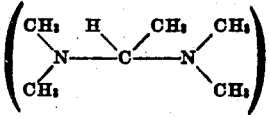

Tetraethyl-ethylidene-diamine

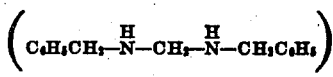

Dibenzyl-methylene-diamine

Other examples are referred to in the illustrative examples given below.

The milling of the neoprene with the plasticizers should preferably be carried out in the absence of other compounding ingredients that would interfere with the plasticizing action of the chemicals. The chemicals are found to be such powerful plasticzers for the neoprene that the neoprene can be markedly softened by mastication in air at ordinary temperatures.

The chemicals used in this invention may be prepared by any of the methods known to the art. In addition to reacting a single aldehyde with a single amine, a mixture of amines and a mixture of aldehydes may be reacted together, and the molecular equivalent of aldehyde used in the reaction to 1 mole of amino nitrogen may vary from ½ mole to 5 or more. Either the pure chemical or the crude product may be used in the invention. The chemicals of this invention may be used in the presence of dithiocarbamates, tetraalkyl thiuram disulfides, mercaptans, disulfides and monosulfides in general, and other plasticizing agents and, in general, any materials that do not harm the plasticizing action of these chemicals.

The preferable amounts for use in neoprene during milling are, by weight, from 0.2 per cent to 3.0 per cent, although smaller or larger amounts may be used, if desired. The temperature of milling is the same as that for ordinary milling of neoprene GN compounds, although the invention is not limited to the temperature of milling. Also, the invention is not limited to the time of standing of the mix before curing either at room temperature or above, before the mix is used.

The following examples are given in illustration of the invention, parts being by weight, and using neoprene GN believed made by polymerizing chloroprene in the presence of sulfur with subsequent stabilization with a thiuram sulfide such as tetra methyl thiuram disulfide:

Example 1

One hundred and twenty-seven and five tenths (127.5) grams of piperidine were cooled in an ice bath. While shaking, 70 grams (about .86 mole) of formaldehyde as 37 per cent solution were added slowly. The reaction mixture was heated for a few minutes on a steam bath then the oily reaction product was washed and dried. The product was then distilled and the fraction coming over at 230–235° C. at atmospheric pressure was collected for testing in neoprene GN. The yield of this fraction was 78 grams.

The following mixes were made on a small mill:

|  | A | B |
|---|---|---|
| Neoprene GN [1] | 100 | 100 |
| Formaldehyde-piperidine reaction product |  | 1.0 |

[1] The neoprene GN here used has the following chlorine, sulfur, and nitrogen analysis by weight: Cl 35.80%; N. 0.27%; S. 1.81%

The chemical was added as soon as the neoprene was working well on the mill. The milling was conducted for 11½ minutes at about 194° F. Total milling time was the same on both A and B. Plasticities were then run on samples of these mixes in the Scott plastometer after 24 hours standing. The plastometer temperature was 212° F. and the plastometer reading was taken on the samples 60 seconds after the start. The test was run by standard procedure. The results were as follows:

| Time of milling | A | B |
|---|---|---|
| 11½ minutes | 544 | 196 |

The figures above are the remaining height in thousandths of an inch in thickness of a sixtenths inch thick sample of the respective mix.

The results plainly show that under the above conditions of processing, the mix B, containing the piperidine formaldehyde reaction product, has been plasticized considerably more than the mix A containing no added chemical.

Example 2

1 mole of butylamine was cooled in an ice bath and 1 mole of formaldehyde as 37 per cent solution was added slowly. The reaction mixture separated into an aqueous and an oil layer. The aqueous layer was separated and the oil was washed with water and then dried.

Example 3

1 mole of butylamine was cooled in an ice bath and butyraldehyde was added slowly. Water of reaction and unreacted materials were removed by distillation.

Example 4

1 mole of hexamethylene imine was cooled in an ice bath and 1 mole of formaldehyde as 37 per cent solution was added slowly. The material was separated from water, was water washed to remove unreacted formaldehyde and impurities, and then dried.

Example 5

1 mole of hexamethylene imine was cooled in an ice bath and 1 mole of butyraldehyde was added slowly. After ten minutes, the product was dried and was ready for use.

The following mixes, in which the parts are by weight, were made on a small mill:

|  | A | B | C | D |
|---|---|---|---|---|
| Neoprene GN | 100 | 100 | 100 | 100 |
| Formaldehyde-butylamine reaction product |  | 1 |  |  |
| Butyraldehyde-butylamine reaction product |  |  |  | 1 |

|  | E | F | G | H |
|---|---|---|---|---|
| Neoprene GN | 100 | 100 | 100 | 100 |
| Formaldehyde-hexamethylene imine reaction product |  | 1 |  |  |
| Butyraldehyde-hexamethylene imine reaction product |  |  |  | 1 |

Mixing and testing were conducted as under Example 1.

A divided mill was used for milling and A and B were milled at the same time. Likewise, C and D, E and F, and G and H were run in like manner. The plasticity results are as follows:

| Time of milling | A | B | C | D | E | F | G | H |
|---|---|---|---|---|---|---|---|---|
| 14 minutes | 403 | 129 | 412 | 229 | 411 | 138 | 394 | 174 |

The results on B, D, F and H as compared to the blanks A, C, E and G definitely show a powerful plasticizing action.

Hexamethylene ammonium dithiocarbamate is a well-known commercial plasticizer for neoprene GN. It has the disadvantage that it softens the neoprene GN very quickly during milling and if the milling has to be extended for a long period of time it starts stiffening up again. The chemicals of this invention appear to be free from this fault.

The neoprene softened as shown above may be compounded by any of the methods known to the art, vulcanized, and used in any type of articles.

Among the amines to be reacted with any of the aldehydes herein are:

Methylamine, ethylamine, n-propylamine, isopropylamine, allylamine, butylamine, amylamine, octylamine, dodecylamine, ethanolamine, cyclohexylamine, benzylamine, dimethylamine, diethylamine, dipropylamine, diamylamine, dioctylamine, didodecylamine, methylamylamine, ethyl dodecylamine, diallylamine, methylallylamine, dibenzylamine, diethanolamine, methyl ethanolamine, piperidine, pipecoline, hexamethylene imine, morpholine, decahydroquinoline, dicyclohexylamine, ethyl cyclohexylamine, ethylene diamine, propylene diamine, diethylene triamine, triethylene tetramine, poly ethylene polyamine, etc.

Among the aldehydes to be reacted with any of the amines herein are:

Formaldehyde, acetaldehyde, propionaldehyde, butyraldehyde, heptaldehyde, benzaldehyde, nitrobenzaldehyde, chlorobenzaldehyde, salicylaldehyde, furfuraldehyde, etc.

The plasticizers of the invention may be added to the neoprene by any of the methods known to the rubber art. The invention may be applied to the conversion of all forms of neoprene, including solid unvulcanized neoprene, reclaims, neoprene cements, neoprene dispersions, etc.

From the above it will be apparent that the present invention allows of converting elastic polychloroprene, and particularly neoprene GN, to a material which can more easily be processed in the factory.

It will be readily apparent to those skilled in the art that many variations and modifications may be made in the compounds employed, methods of treating and other conditions without departing from the spirit of the invention. The use of these chemicals is not limited to the nature of the ingredients that are later added to the mix before vulcanizing the neoprene. Also, it is not limited to the ingredients that are used in the polymerization of chloroprene to neoprene or are added to the crude neoprene for preservation, etc. before use by the manufacturer.

Having thus described by invention, what I claim and desire to protect by Letters Patent is:

1. A process of preparing a plastic conversion product of elastic polychloroprene which comprises milling a mixture containing the same in the presence of air with a reaction product of an aliphatic aldehyde and an amine selected from the group consisting of secondary aliphatic, secondary aralkyl, secondary alicyclic and secondary heterocyclic amines.

2. A process of preparing a plastic conversion product of elastic polychloroprene which comprises milling a mixture containing the same with a product of reaction of 1 molecular proportion of an aliphatic aldehyde with 2 molecular proportions of an amine selected from the group consisting of secondary aliphatic, secondary aralkyl, secondary alicyclic and secondary heterocyclic amines.

3. A process of preparing a plastic conversion product of elastic polychloroprene which comprises milling a mixture containing the same with a reaction product of an aliphatic aldehyde and an amine selected from the group consisting of secondary aliphatic, secondary aralkyl, secondary alicyclic and secondary heterocyclic amines.

4. A process of preparing a plastic conversion product of elastic polychloroprene which comprises milling a mixture containing the same with a reaction product of formaldehyde and an amine selected from the group consisting of secondary aliphatic, secondary aralkyl, secondary alicyclic and secondary heterocyclic amines.

5. A process of preparing a plastic conversion product of elastic polychloroprene which comprises milling a mixture containing the same with a reaction product of butyraldehyde and an amine selected from the group consisting of secondary aliphatic, secondary aralkyl, secondary alicyclic and secondary heterocyclic amines.

6. A process of preparing a plastic conversion product of elastic polychloroprene which comprises milling a mixture containing the same with a reaction product of an aldehyde and a secondary heterocyclic amine.

7. A process of preparing a plastic conversion product of elastic polychloroprene which comprises milling a mixture containing the same with a reaction product of an aldehyde and pentamethylene imine.

8. A process of preparing a plastic conversion product of elastic polychloroprene which comprises milling a mixture containing the same with a reaction product of an aldehyde and hexamethylene imine.

9. A process of preparing a plastic conversion product of elastic polychloroprene which comprises milling a mixture containing the same with a reaction product of an aliphatic aldehyde and an aliphatic secondary amine.

10. A process of preparing a plastic conversion product of an elastic polychloroprene which comprises milling a mixture containing the same with a condensation product of formaldehyde and an aliphatic secondary amine.

11. A process of preparing a plastic conversion product of elastic polychloroprene which comprises milling a mixture containing the same with a condensation product of formaldehyde and pentamethylene imine.

12. A process of preparing a plastic conversion product of elastic polychloroprene which comprises milling a mixture containing the same with a condensation product of butyraldehyde and hexamethylene imine.

13. A plastic conversion product of an elastic polychloroprene containing combined therein a compound which is a reaction product of an aliphatic aldehyde and an imine selected from the group consisting of secondary aliphatic, secondary aralkyl, secondary alicyclic and secondary heterocyclic amines.

LOUIS H. HOWLAND.